(12) United States Patent
Mestdagh et al.

(10) Patent No.: US 7,010,027 B1
(45) Date of Patent: Mar. 7, 2006

(54) MULTISTANDARD DISCRETE MULTI-TONE (DMT) DIGITAL SUBSCRIBER LINE (DSL) SYSTEM

(75) Inventors: Denis J.G. Mestdagh, Saint Martin D'Uriage (FR); Gérard Fargere, Prevessins-Möens (FR); Mikael R. Isaksson, Lulea (SE)

(73) Assignees: STMicroelectronics S.A., Montrouge (FR); STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/856,738

(22) PCT Filed: Nov. 24, 1999

(86) PCT No.: PCT/EP99/09475

§ 371 (c)(1),
(2), (4) Date: Oct. 1, 2001

(87) PCT Pub. No.: WO00/31938

PCT Pub. Date: Jun. 2, 2000

(30) Foreign Application Priority Data

Nov. 24, 1998 (EP) .................................. 98410131

(51) Int. Cl.
*H04B 1/38* (2006.01)
*H04L 5/16* (2006.01)

(52) U.S. Cl. ............... 375/222; 375/219; 370/203; 370/206; 370/210

(58) Field of Classification Search ............... 375/219, 375/222, 260, 261, 298; 455/557; 370/210, 370/203, 206

See application file for complete search history.

(56) References Cited

U.S. PATENT DOCUMENTS

| | | | |
|---|---|---|---|
| 5,519,731 A | | 5/1996 | Cioffi |
| 5,673,290 A | * | 9/1997 | Cioffi ..................... 375/260 |
| 5,680,394 A | * | 10/1997 | Bingham et al. ........ 370/294 |
| 5,742,527 A | * | 4/1998 | Rybicki et al. .......... 708/109 |
| 5,917,809 A | | 6/1999 | Ribner et al. |
| 6,009,122 A | * | 12/1999 | Chow ..................... 375/260 |
| 6,014,412 A | * | 1/2000 | Wiese et al. ............ 375/346 |

OTHER PUBLICATIONS

Bidet, "A fast single-chip implementation of 8192 complex point FFT", Mar. 1995, IEEE Journal of Solid-State Circuits, vol. 30, N. 3, Page(s): 300-305.*
International Search Report from application No. PCT/EP99/09475.

* cited by examiner

*Primary Examiner*—Kevin Burd
*Assistant Examiner*—Juan Alberto Torres
(74) *Attorney, Agent, or Firm*—Lisa K. Jorgenson; James H. Morris; Wolf, Greenfield & Sacks, P.C.

(57) ABSTRACT

A digital subscriber line transmission system using QAM modulation on several equally spaced discrete tones, uses, at a high transmission rate, N=2048/p or 4096/p tones spaced by 4.3125p KHz, where p is a power of 2.

27 Claims, 3 Drawing Sheets

MULTISTANDARD DISCRETE MULTI-TONE (DMT) DIGITAL SUBSCRIBER LINE (DSL) SYSTEM

BACKGROUND OF THE INVENTION

1. Field of the Invention

The present invention relates to discrete multitone (DMT) based digital subscriber line (DSL) transmission systems which allow high speed communication on twisted pair telephone lines. The invention relates more specifically to a VDSL (Very high speed DSL) system which can be used with several existing or forthcoming standards.

2. Discussion of the Related Art

FIG. 1 shows the spectrum of a signal transmitted according to the ADSL and ADSL-Lite (asymmetric DSL) standards. The ADSL standard uses quadrature amplitude modulation (QAM) on each of 256 tones, the tones being equally spaced by 4.3125 KHz. Thus, as shown, the last tone has a frequency of 1.104 MHz. The ADSL-Lite standard only uses the first 128 tones.

As shown, a gap is left at the beginning of the spectrum for "plain old telephone services" (POTS).

According to the ADSL standards, most of the tones are used for reception, the few remaining tones being used for transmission, hence the term "asymmetric DSL".

Current VDSL standardization proposals contemplate the use of frequencies up to 11.04 MHz.

FIG. 2 shows the spectrum of a signal transmitted by a conventional VDSL time domain duplexing (TDD) system such as described in "VDSL Alliance SDMT VDSL Draft Standard Proposal", ETSI STC/TM6, 973T13R0, Lannion, France, September 29–Oct. 3, 1997. This system uses 256 or 512 tones spaced, respectively, by 43 or 21.5 KHz. The last tone has a frequency of 11.04 MHz. All the tones are used for a same transmission direction at one time, the transmission direction being switched every other transmitted symbol.

FIG. 3 shows the spectrum a signal transmitted by a conventional VDSL "Zipper" system as disclosed in patent application WO 97/06619. It uses 2048 tones spaced by 5.375 KHz, the last tone also having a frequency of 11.04 MHz. In this system, the tones used for transmission and for reception are chosen dynamically in order to cancel near-end crosstalk and near-end echoes.

FIG. 4 very schematically shows a DSL transmission system at one end of a telephone line 10. An inverse fast Fourier transform (IFFT) circuit 12 receives N complex frequency domain coefficients, where N is the number of tones used by the system, i.e. 128 or 256 for the ADSL standards, 256 or 512 for the VDSL TDD system, and 2048 for the VDSL Zipper system. The IFFT circuit 12 generates, for each set of N coefficients, a time domain symbol. A symbol is thus the sum of N sinusoidal subcarriers of different frequencies corresponding respectively to the tones. The amplitude and phase of each subcarrier is determined by the corresponding frequency domain coefficient received by the IFFT circuit. The symbols are processed by a digital-to-analog converter 14 and a low-pass filter 16 and then transferred onto telephone line 10 through a hybrid line interface 18.

A cyclic prefix and a cyclic suffix are added to the symbol output by IFFT circuit 12 at 19. The cyclic prefixes are intended to eliminate intersymbol interference in the far-end receiver by providing a guard period during which the propagation transients of the line may decay. The cyclic suffix is intended to cancel the effects of the sampling of discontinuities in near-end echoes.

Line interface 18 also receives incoming symbols from line 10. These incoming symbols are provided to a fast Fourier transform (FFT) circuit 20 through a low-pass filter 22, an analog-to-digital converter 24 and, if necessary, through a time domain equalizer 26.

The above mentioned cyclic prefix, in order to accomplish its role, has a minimum length independent of the symbol length. In DSL systems using a relatively low number of tones, such as ADSL and VDSL TDD, the transmitted symbols are short, whereby the minimum length of the cyclic prefix is so long that it causes a substantial efficiency loss in the data transmission. In this case, the cyclic prefix is chosen shorter than necessary and it is the role of the time domain equalizer 26 to complement the short cyclic prefixes in the elimination of the intersymbol interference.

In DSL systems using a large number of tones, such as in the VDSL Zipper system, the generated symbols are so long that the cyclic prefixes can be chosen at the necessary length without substantially affecting the efficiency of the transmission. In such systems, the time domain equalizer 26 is omitted.

Moreover, in a VDSL TDD system, since the IFFT circuit and FFT circuit are never used at the same time, it is a single circuit which performs both functions.

The IFFT and FFT circuits operate at least at twice the frequency of the last tone used by the system, i.e. 1.104 MHz for ADSL-Lite, 2.208 MHz for ADSL, and 22.08 MHz for the known VDSL systems.

It is clear that the ADSL standards and forthcoming VDSL standards differ in many ways (the number of used tones, the spacing between the tones, the operation frequency of the IFFT and FFT circuits . . . ), which is likely to increase the number of types of modems capable of exploiting these standards.

SUMMARY OF THE INVENTION

An object of the invention is to provide a transmission system which allows a single modem to exploit many DSL standards with a low complexity.

To achieve this and other objects, the invention provides a digital subscriber line transmission system using QAM modulation on several equally spaced discrete tones. At a high transmission rate, the system uses $N=2048/p$ or $4096/p$ tones spaced by $4.3125p$ KHz, where p is a power of 2.

According to an embodiment of the invention, for transmitting at a low transmission rate according to an ADSL standard, only the first $n=128$ or 256 tones are used with $p=1$.

According to an embodiment of the invention, the system comprises, on the transmitter side, an inverse fast Fourier transform circuit having N frequency domain value inputs corresponding to said tones, among which only the first receive values corresponding to the n used tones, the remaining inputs being zeroed, a decimator providing one sample for every r samples output by the IFFT circuit, with $r=N/n$, and a digital-to-analog converter coupled between the decimator and a subscriber line.

According to an embodiment of the invention, the system comprises, on the receiver side, an analog-to-digital converter sampling the signal on the subscriber line at a frequency $F/r$, where F is the operating frequency of the IFFT circuit; an interpolator generating samples at frequency F from the samples provided by the analog-to-digital converter; and a fast Fourier transform circuit operating at frequency F and receiving the samples from the interpolator through a time domain equalizer. When all N tones are used, the time domain equalizer is bypassed.

According to an embodiment of the invention, the system is applicable to a standard using n first tones among the N tones, where n is a power of 2. It comprises, at a transmitter side, an IFFT circuit having a number of frequency domain inputs selectable at least among values N and n; and an operating frequency selectable at least among two values F and fn proportional, respectively, to the frequency of the last of the N tones at the high transmission rate, and to the last of the n tones.

According to an embodiment of the invention, the system comprises, at a receiver side, an FFT circuit having a number of frequency domain outputs selectable at least among values N and n; and an operating frequency selectable at least among values F and fn.

According to an embodiment of the invention, each of the IFFT and FFT circuits includes five radix-4 stages and a last radix-2 or radix-4 stage connected to operate in pipeline mode, the desired number of frequency domain inputs or outputs of the circuit being selected by bypassing an appropriate number of stages and by selecting the radix of the last stage.

The foregoing and other objects, features, aspects and advantages of the invention will become apparent from the following detailed description of embodiments, given by way of illustration and not of limitation with reference to the accompanying drawings.

DETAILED DESCRIPTION

Figure 1:
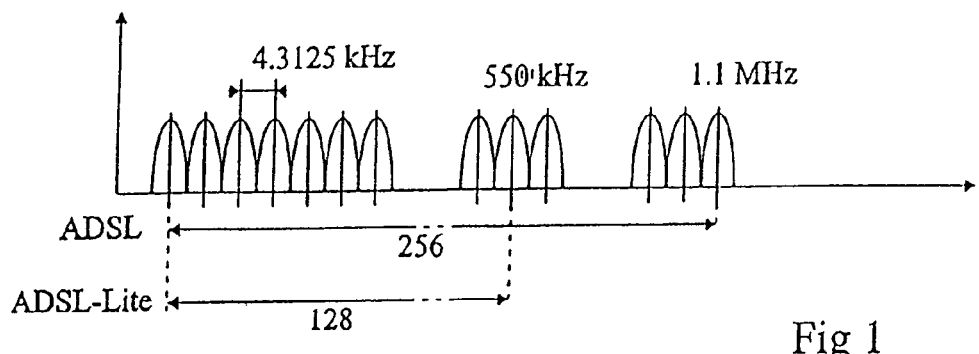
FIG. 1, previously described, shows a spectrum of signals transmitted according to the ADSL and ADSL-Lite standards.
Figure 2:
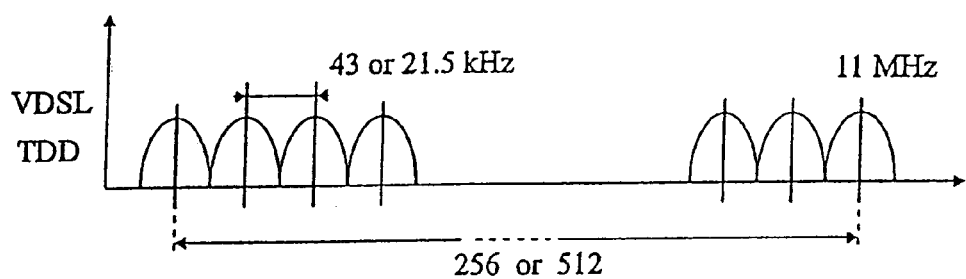
FIG. 2, previously described, shows a spectrum of signals transmitted in a conventional VDSL TDD system.
Figure 3:
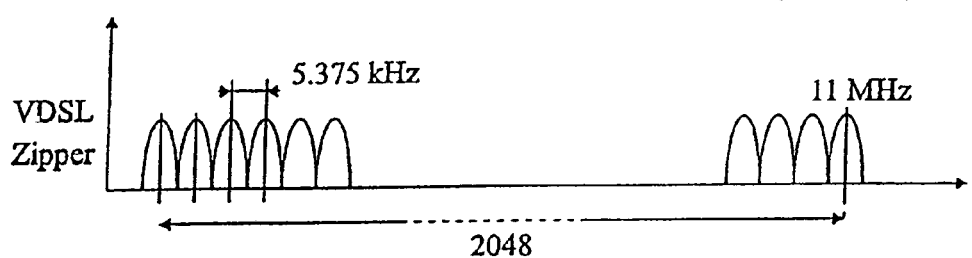
FIG. 3, previously described, shows a spectrum of signals transmitted in a conventional VDSL "Zipper" system.
Figure 4:
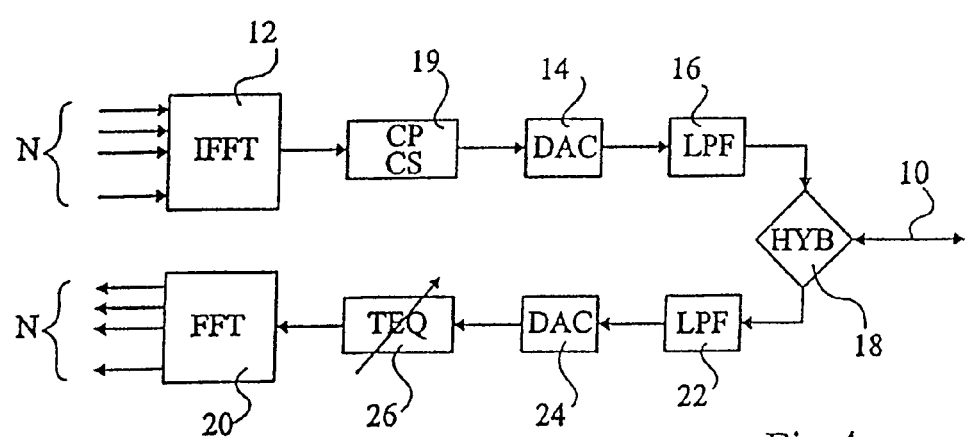
FIG. 4 partially and schematically shows a DSL transmission system.
Figure 5:
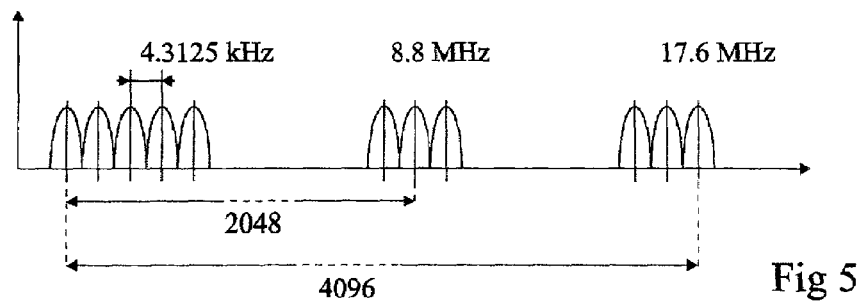
FIG. 5 shows a spectrum of signals transmitted in an embodiment of a VDSL system according to the invention.

As illustrated by the spectrum of FIG. 5, an aspect of the invention is to extend the spectrum of an ADSL-Lite transmission in order to approach the maximum frequency used in conventional VDSL systems, i.e. 11.04 MHz. The number of tones should be a power of 2 to be compatible with IFFT and FFT circuits of conventional architecture. In the embodiment of FIG. 5, the invention uses either 2048 or 4096 tones spaced by 4.3125 KHz. By using 2048 tones, the last tone has a frequency of 8.832 MHz, whereby the transmission rate is slightly reduced with respect to a system which uses tones up to the design limit of 11.04 MHz. In fact, this does not significantly reduce the transmission rate, because, in most cases, the last tones near 11.04 MHz can only convey very little information or no information at all due to a large attenuation.

However, in case the transmission conditions are excellent, the invention allows the use of 4096 tones spaced by 4.3125 KHz, whereby the last tone has a frequency of 17.664 MHz.

An aspect of the invention is to note that such a system, using 2048 tones or 4096 tones, is immediately usable with any standard using fewer tones at the same spacing, such as 128 or 256 (ADSL-Lite, ADSL).

To transmit data according to the ADSL or ADSL-Lite standards with the above solution, it is sufficient to just use the first 128 or 256 tones by providing corresponding coefficients to the first frequency domain inputs of the IFFT circuit, and by zeroing the remaining inputs. In reception mode, the FFT circuit will extract and provide to its first 128 or 256 outputs the desired coefficients, the remaining coefficients being zero.

The only modification needed to the transmission system is to provide zero-padding and depadding circuitry for adapting the low rate of the effective digital data transmission to the fixed high operation speed of the IFFT and FFT circuits.

A drawback of such a system is however that it operates at the highest frequency, adapted to the highest transmission rate, whereas the effective data transmission rate may be much lower. This causes unnecessary extra power consumption vy the analog front-end.

Figure 6:
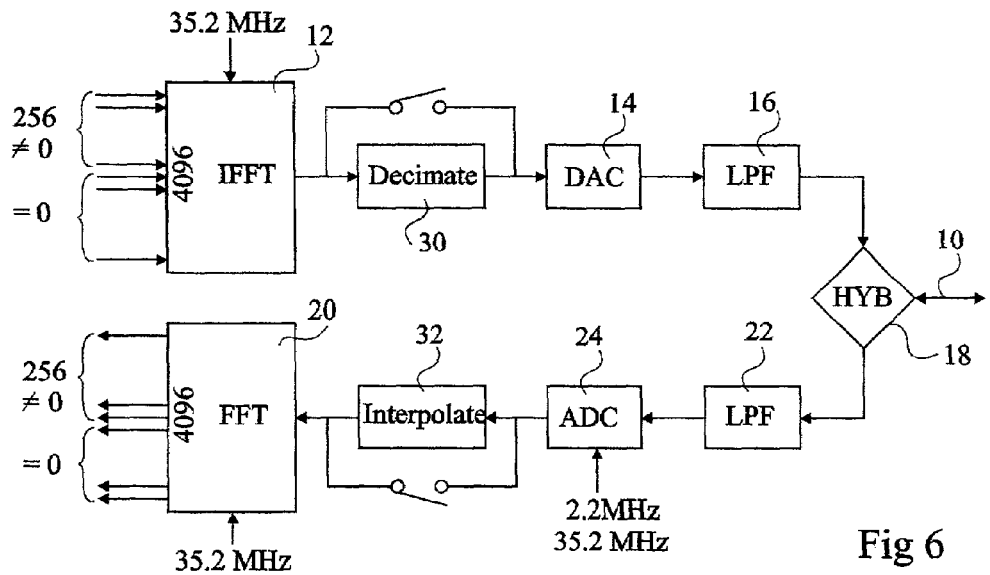
FIG. 6 partially and schematically shows an embodiment of a VDSL system according to the invention adaptable to the ADSL and ADSL-Lite standards.

FIG. 6 schematically shows an embodiment of a transmission system operating as described above and additionally provided with circuitry for reducing the power consumption. As an example, the system is intended to operate with 2048 tones and is used with the ADSL standard, which will only use 256 tones. As shown, only the first 256 inputs of IFFT circuit 12 and the 256 first outputs of FFT circuit 20 are used.

The IFFT and FFT circuits operate at 17.664 MHz, i.e. twice the frequency of the last of the 2048 tones. The IFFT circuit 12 thus generates samples at 17.664 MHz. These samples are provided to a decimator 30 which provides only every 8th sample to digital-to-analog converter 14. Digital-to-analog converter 14 then operates 8 times slower, i.e. at 2.208 MHz. Of course, the cut-off frequency of the low-pass filters 16 and 22 is adapted to the frequency of the digital-to-analog converter 14.

The analog-to-digital converter 24 is clocked to sample the received signal 8 times slower, i.e. at 2.208 MHz, and the samples are provided to an interpolator 32 which generates the missing samples to provide to FFT circuit 20 at 17.664 MHz.

With the above example, the power consumed by converters 14 and 24 is substantially reduced. This power consumption will be further reduced if the ADSL-Lite standard is used with the system.

When the system is used at its highest transmission rate, the decimator 30 and the interpolator 32 are bypassed as shown by switches, and the analog-to-digital converter 24 is clocked at the same speed as the IFFT and FFT circuits, i.e. 17.664 MHz in the example.

A purpose of a second embodiment of the invention is to further reduce the power consumption when the system is used at lower transmission rates.

In order to reduce the power consumption, it would be useful to also adapt the operating frequency of the IFFT and FFT circuits to the transmission rate effectively used, like the clock frequency of analog-to-digital converter 24 in FIG.

6. However, by changing the operating frequency of the IFFT and FFT circuits, the spacing of the tones is also changed, which is not desired.

To avoid this, the invention provides IFFT and FFT circuits of variable size, which is equivalent to making variable the number of tones used by the system. Then, if the size of the IFFT an FFT circuits is reduced by a factor k, it is sufficient to reduce the operating speed of the IFFT and FFT circuits by the same factor k to maintain the spacing between the tones. In the example of FIG. 6, the number of tones will be reduced by a factor 8, whereby the IFFT and FFT circuits would operate 8 times slower, i.e. at 2.208 MHz, the same frequency as analog-to-digital converter 24. Decimator 30 and interpolator 32 are unnecessary.

With this system, the total power consumption will be substantially proportional to the effective transmission rate used on the system.

In contrast to what could be expected, making variable the number of inputs or outputs of an IFFT or FFT circuit is particularly simple if the number remains a power of 2.

Figure 7:
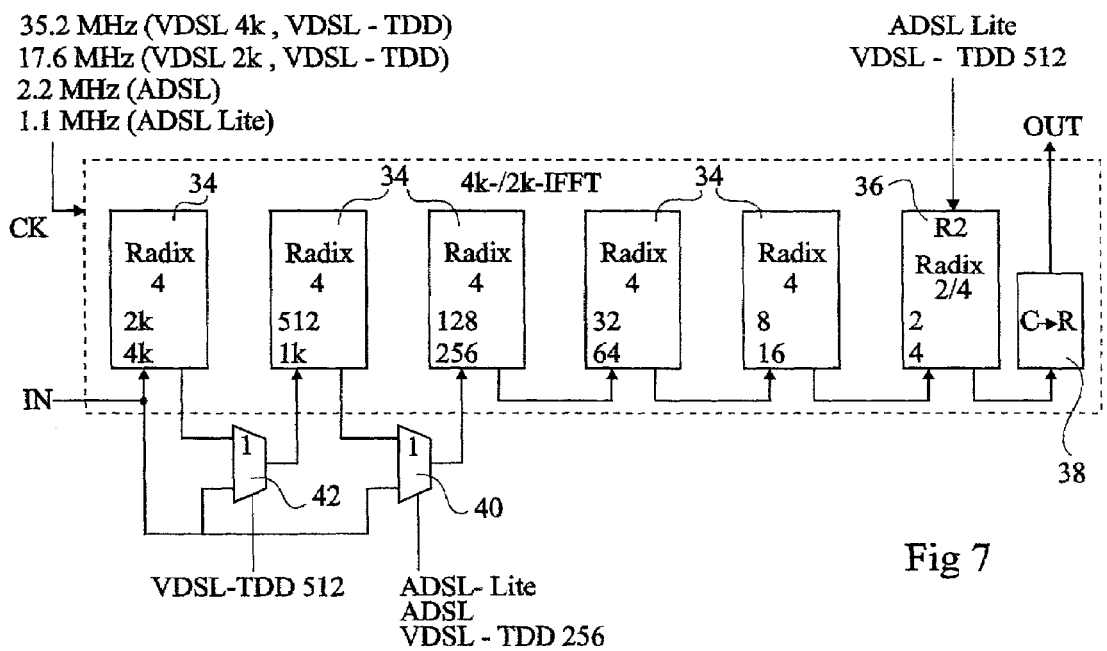
FIG. 7 schematically shows an embodiment of an IFFT circuit used in a VDSL system according to the invention.

FIG. 7 schematically illustrates an IFFT circuit of a conventional pipeline type, modified according to the invention for making the number of inputs variable. The IFFT circuit comprises 5 pipelined radix-4 stages 34 followed by a last stage 36 which may be switched between radix-2 and radix-4. The number of frequency domain inputs of the IFFT circuit is equal to the product of the radices of the stages. If the last stage is a radix-2, the IFFT circuit has 2048 inputs, whereas if the last stage is a radix-4, the IFFT circuit has 4096 inputs.

Preferably, the last stage 36 can be switched between a radix-4 or radix-2 operation mode by a switch signal R2. For this purpose, the stage is a full radix-4 and, for operating in radix-2 mode, suitable elements of the stage are bypassed.

Each stage receives and provides complex coefficients at the digital data transmission rate. Each complex coefficient, corresponding at the input of the first stage to one data word, has a real part and an imaginary part which are processed in two respective cycles, hence the operating frequency of the IFFT circuit is twice the data transmission rate. The operating frequency is set by a clock signal CK.

A radix-4 stage operates on 4 consecutive coefficients whereas a radix-2 stage only operates on 2 consecutive coefficients. Each coefficient provided by the last stage 36 is converted into two time domain samples by a complex to real converter 38.

The number of inputs corresponding to each stage is indicated in FIG. 7 at the bottom of the stages, a first value being the number of inputs when the last stage 36 is a radix-2, and a second value being the number a inputs when the last stage 36 is a radix-4. It thus clearly appears that the number of inputs of the IFFT circuit is selectable by bypassing one or several first stages of the circuit and by suitably selecting the radix of last stage 36.

For the ADSL-Lite standard, the first two stages 34 of the IFFT circuit are bypassed by a multiplexer 40, the radix of the last stage 36 is chosen equal to 2, and the clock CK has a frequency of 1.104 MHz.

For the ADSL standard, the first two stages 34 of the IFFT circuit are also bypassed by multiplexer 40, the radix of the last stage 36 is chosen equal to 4, and the frequency of clock CK is chosen equal to 2.208 MHz. For a VDSL transmission with 2048 tones according to FIG. 5, none of the stages is bypassed, the radix of the last stage 36 is chosen equal to 2, and the frequency of clock CK is chosen equal to 17.664 MHz.

A VDSL-TDD transmission would be modified to use a maximum frequency of 17.664 or 35.328 MHz instead of 22 MHz.

For such a modified VDSL-TDD transmission with 512 tones, the first stage 34 is bypassed by a multiplexer 42, and the radix of last stage 36 is chosen equal to 2.

For a modified VDSL-TDD transmission with 256 tones, the two first stages 34 are bypassed by multiplexer 40, and the radix of last stage 36 is chosen equal to 4.

Finally, for the VDSL transmission of FIG. 5 with 4096 tones, none of the stages is bypassed, the radix of the last stage 36 is chosen equal to 4, and the frequency of clock CK is chosen equal to 35.328 MHz.

An FFT circuit with a selectable number of outputs is constructed in the same manner as the IFFT circuit of FIG. 7. The differences are that the first stage is preceded by a real to complex converter which provides the real and imaginary parts of each complex coefficient in reverse order. The initial order is re-established at the output of the last stage, which is not followed by a complex to real converter.

Further information on pipeline IFFT and FFT circuits can be found, for example, in "A Fast Single-Chip Implementation of 8192 Points FFT", IEEE Journal of Solid State Circuits, Vol. 30, No. 3, March 1995, Bidet, Castelain, Joanblanq, and Senn.

It is designed, for VDSL-TDD and VDSL "Zipper" modems, that the tones will be used in an initial phase to transmit modem identification signatures. In other words, a transmitting modem, before establishing a communication, will send a signal conveying specific tones or "bare" carriers, chosen depending on the standard among the possible tones. The receiving modem will detect which tones are present in the signal and identify the standard accordingly. For this purpose, the receiving modem should be "tuned-in" on the transmitting modem from the start, i.e. use at least the tones used by the transmitting modem. Every 8th or every 4th tone of a VDSL Zipper modem is used by a VDSL-TDD modem, whereby such an identification phase is possible in both directions if only the 256 or 512 tones of the VDSL-TDD system are used for the signatures.

If an ADSL modem should send signatures using consecutive tones, a modem according to the invention should be consistent with FIG. 5, i.e. use a tone spacing of 4.3125 KHz. However, since the signatures are not yet standardized, it may be devised that an ADSL modem will send signatures using only every $p^{th}$ tone, where p is a power of 2. In this case, a modem having variable size IFFT and FFT circuits according to the invention may initially use a tone spacing of 4.3125p KHz and 2048/p or 4096/p tones and be switched to use 128 or 256 tones with a spacing of 4.3125 KHz upon identifying a remote ADSL modem.

Figure 8:
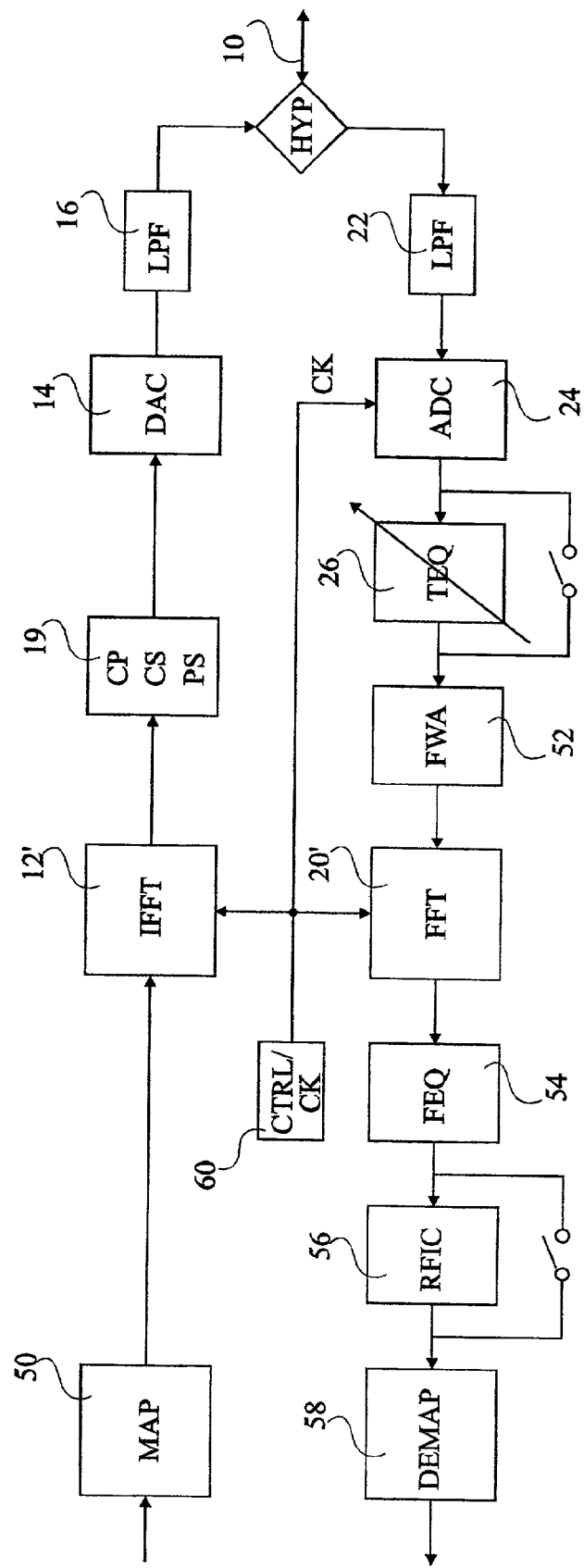
FIG. 8 schematically shows an architecture of a universal DSL modem according to the invention, incorporating IFFT and FFT circuits according to FIG. 7.

FIG. 8 partially and schematically shows an architecture of a universal DSL modem incorporating IFFT and FFT circuits 12' and 20' as described above. Elements shown in previous figures are designated by same reference characters. The IFFT circuit 12' is preceded by a mapper 50 which associates complex coefficients to outgoing digital words. Circuit 19 which adds cyclic prefixes and cyclic suffixes to the symbols provided by IFFT circuit 12' also achieves pulse shaping. A windowing or frequency weighted averaging is achieved at 52 on the data provided by time domain equalizer 26 to FFT circuit 20'. The output of FFT circuit 20' is successively processed by a frequency domain equalizer 54, a radio frequency interference canceller 56 and a demapper 58 which achieves the inverse function of mapper 50.

The IFFT and FFT circuits 12' and 20' are controlled by a controller 60 as described above in relation with FIG. 7.

Controller 60 also sets the sampling frequency of analog-to-digital converter 24 at the operating frequency of the IFFT and FFT circuits. Moreover, controller 60 bypasses the time domain equalizer 26 and the radio frequency interference canceller 26, as shown by switches, when the number of tones used by the system is equal to 2048 or 4096.

Elements of the architecture of FIG. 8 which are not further described are conventional and can be found in modems for existing standards, such as ADSL and ADSL-Lite (disclosed in Standard T1.413).

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A digital subscriber line transmission system using QAM modulation on N=4096/p tones spaced by 4.3125 kHz wherein p and q are powers of 2 (p=1, 2, 4, 8, . . . ; q=1, 2, 4, 8, . . . ), including at least two operating modes:
   a VDSL standard operating mode where all N tones are used to convey significant values; and
   an ADSL standard operating mode where only the first n among the N tones are used to convey significant values;
   comprising, on the transmitter side:
   an inverse fast Fourier transform circuit having N frequency domain value inputs corresponding to said tones, among which only the first receive values corresponding to the n used tones, the remaining inputs being zeroed,
   a decimator providing one sample for every r samples output by the inverse fast Fourier transform circuit, with r=N/n,
   a digital-to-analog converter coupled between the decimator and a subscriber line;
   comprising, on the receiver side:
   an analog-to-digital converter sampling the signal on the subscriber line at a frequency F/r, where F is the operating frequency of the inverse fast Fourier transform circuit;
   an interpolator generating samples at frequency F from the samples provided by the analog-to-digital converter; and
   a fast Fourier transform circuit operating at frequency F and receiving the samples from the interpolator through a time domain equalizer;
   wherein, when all N tones are used, the time domain equalizer is bypassed.

2. The system of claim 1 comprising, at a transmitter side, an inverse fast Fourier transform circuit having:
   a number of frequency domain inputs selectable at least among values N and n; and
   an operating frequency selectable at least among two values F and fn proportional, respectively, to the frequency of the last of the N tones and the last of the n tones.

3. The system of claim 2, comprising, at a receiver side, a fast Fourier transform circuit having:
   a number of frequency domain outputs selectable at least among values N and n; and
   an operating frequency selectable at least among values F and fn.

4. The system of claim 3, wherein each of the inverse fast Fourier transform and fast Fourier transform circuits includes five radix-4 stages and a last stage having a radix selectable among 2 and 4, all connected to operate in pipeline mode, the desired number of frequency domain inputs or outputs of the circuit being selectable by bypassing a number of the five radix-4 stages and by selecting the radix of the last stage.

5. The system of claim 4, wherein the desired number of frequency domain inputs or outputs of the circuit is the product of the radices of all stages which are not bypassed.

6. The system of claim 4:
   wherein each stage receives and provides complex coefficients at a digital data transmission rate;
   wherein each complex coefficient has a real part and an imaginary part;
   wherein the real part of each complex coefficient and the imaginary part of each complex coefficient are processed in two distinct cycles; and
   wherein the operating frequency of the system is twice the digital data transmission rate.

7. The system of claim 4, wherein an ADSL-Lite standard operating mode is implemented by bypassing two of the five radix-4 stages and selecting the last stage to be radix-2.

8. The system of claim 7, wherein the operating frequency is 1.104 MHz.

9. The system of claim 4, wherein an ADSL standard operating mode is implemented by bypassing two of the five radix-4 stages and selecting the last stage to be radix-4.

10. The system of claim 9, wherein the operating frequency is 2.208 MHz.

11. The system of claim 4, wherein a VDSL standard operating mode, using N=2048 tones, is implemented by bypassing none of the five radix-4 stages and selecting the last stage to be radix-2.

12. The system of claim 11, wherein the operating frequency is 17.664 MHz.

13. The system of claim 4, wherein a VDSL standard operating mode, using N=4096 tones, is implemented by bypassing none of the five radix-4 stages and selecting the last stage to be radix-4.

14. The system of claim 13, wherein the operating frequency is 35.328 MHz.

15. The system of claim 4, wherein a VDSL standard operating mode being used for a VDSL-TDD transmission using 512 tones is implemented by bypassing one of the radix-4 stages and selecting the last stage to be radix-2.

16. The system of claim 4, wherein a VDSL standard operating mode being used for a VDSL-TDD transmission using 256 tones is implemented by bypassing two of the radix-4 stages and selecting the last stage to be radix-4.

17. The system of claim 4, wherein a VDSL standard operating mode may be used for a VDSL-TDD transmission, the VDSL-TDD transmission having a maximum frequency of 17.664 MHz.

18. The system of claim 4, wherein a VDSL standard operating mode may be used for a VDSL-TDD transmission, the VDSL-TDD transmission having a maximum frequency of 35.328 MHz.

19. The system of claim 1, wherein a receiving modem can identify the standard operating mode before establishing communication with a transmitting modem.

20. The system of claim 19,
  wherein the transmitting modem sends a modem identification signature; and
  wherein the receiving modem, by identifying which of the N tones are present in the modem identification signature, identifies the standard operating mode.

21. The system of claim 20, wherein the modem identification signature comprises a signal comprising a plurality of the N tones.

22. The system of claim 21, wherein the modem identification signature of an ADSL modem comprises a plurality of consecutive tones.

23. The system of claim 21,
  wherein the transmitting modem is an ADSL modem; and
  wherein the modem identification signature comprises every pth tone of the N tones, p being a power of 2.

24. The system of claim 21, wherein the transmitting modem is a VDSL Zipper modem and the receiving modem is a VDSL-TDD modem; and
  wherein the modem identification signature comprises every $8^{th}$ tone of the VDSL Zipper modem.

25. The system of claim 21, wherein the transmitting modem is a VDSL Zipper modem and the receiving modem is a VDSL-TDD modem; and
  wherein the modem identification signature comprises every $4^{th}$ tone of the VDSL Zipper modem.

26. The system of claim 1, wherein n=128 or 256.

27. The system of claim 1, wherein n=2512.

* * * * *

UNITED STATES PATENT AND TRADEMARK OFFICE
CERTIFICATE OF CORRECTION

PATENT NO. : 7,010,027 B1  
APPLICATION NO. : 09/856738  
DATED : March 7, 2006  
INVENTOR(S) : Denis Julien Gilles Mestdagh et al.

It is certified that error appears in the above-identified patent and that said Letters Patent is hereby corrected as shown below:

In column 2, lines 46 - 47 should read:

--high transmission rate, the system uses N=4096/p tones spaced by 4.3125q kHz wherein p and q are powers of 2 (p=1, 2, 4, 8, . . . ; q=1, 2, 4, 8, . . . ).--

Column 4, line 29 should read:  
--tion by the analog front-end.--

Column 7, Claim 1, line 2 should read:  
--QAM modulation on N=4096/p tones spaced 4.3125q kHz 2--

Signed and Sealed this

Fifth Day of August, 2008

JON W. DUDAS  
*Director of the United States Patent and Trademark Office*